May 14, 1935.  F. W. WEST  2,001,641
MEAT TENDERER
Filed June 21, 1934   2 Sheets-Sheet 2
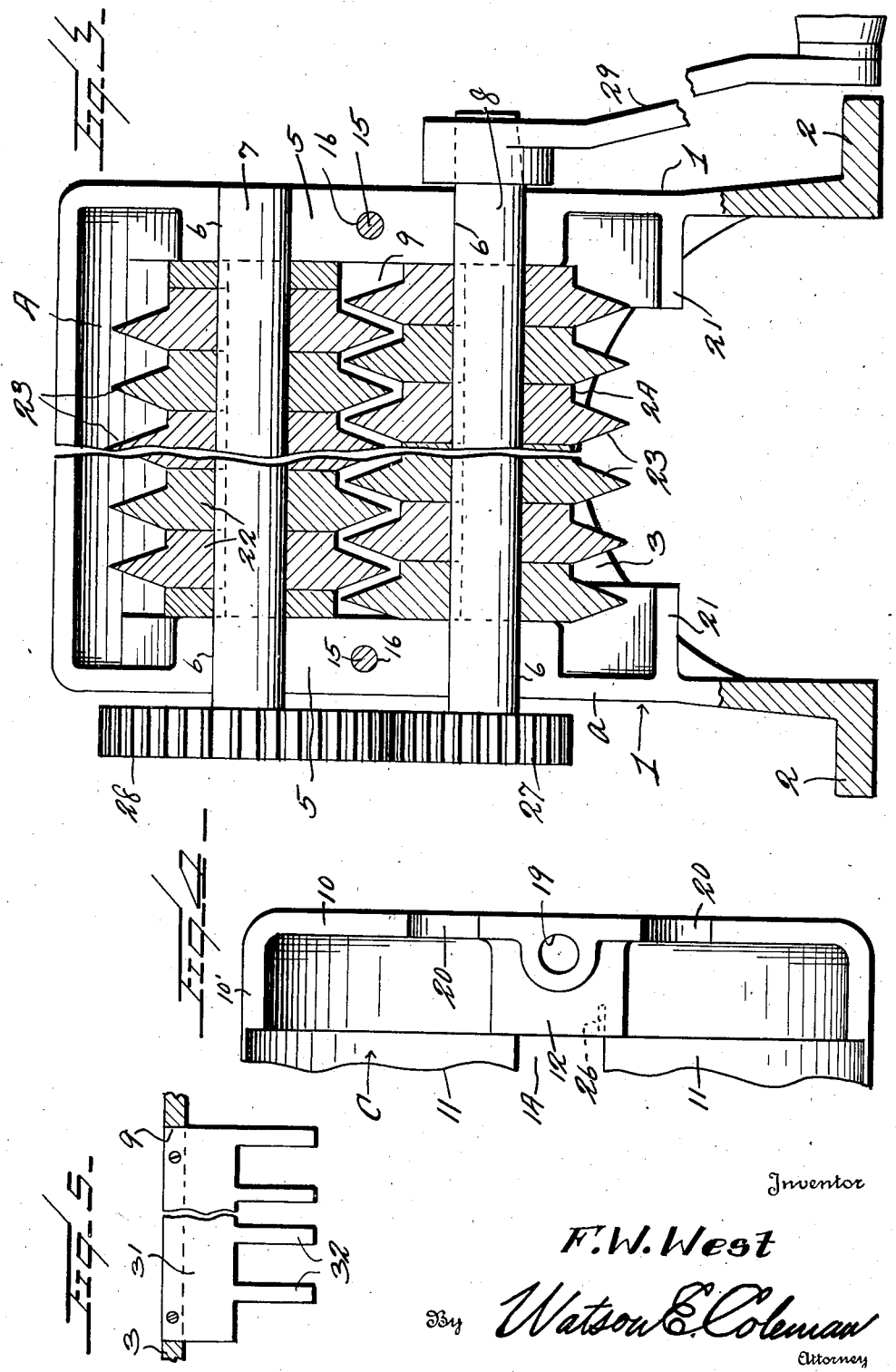

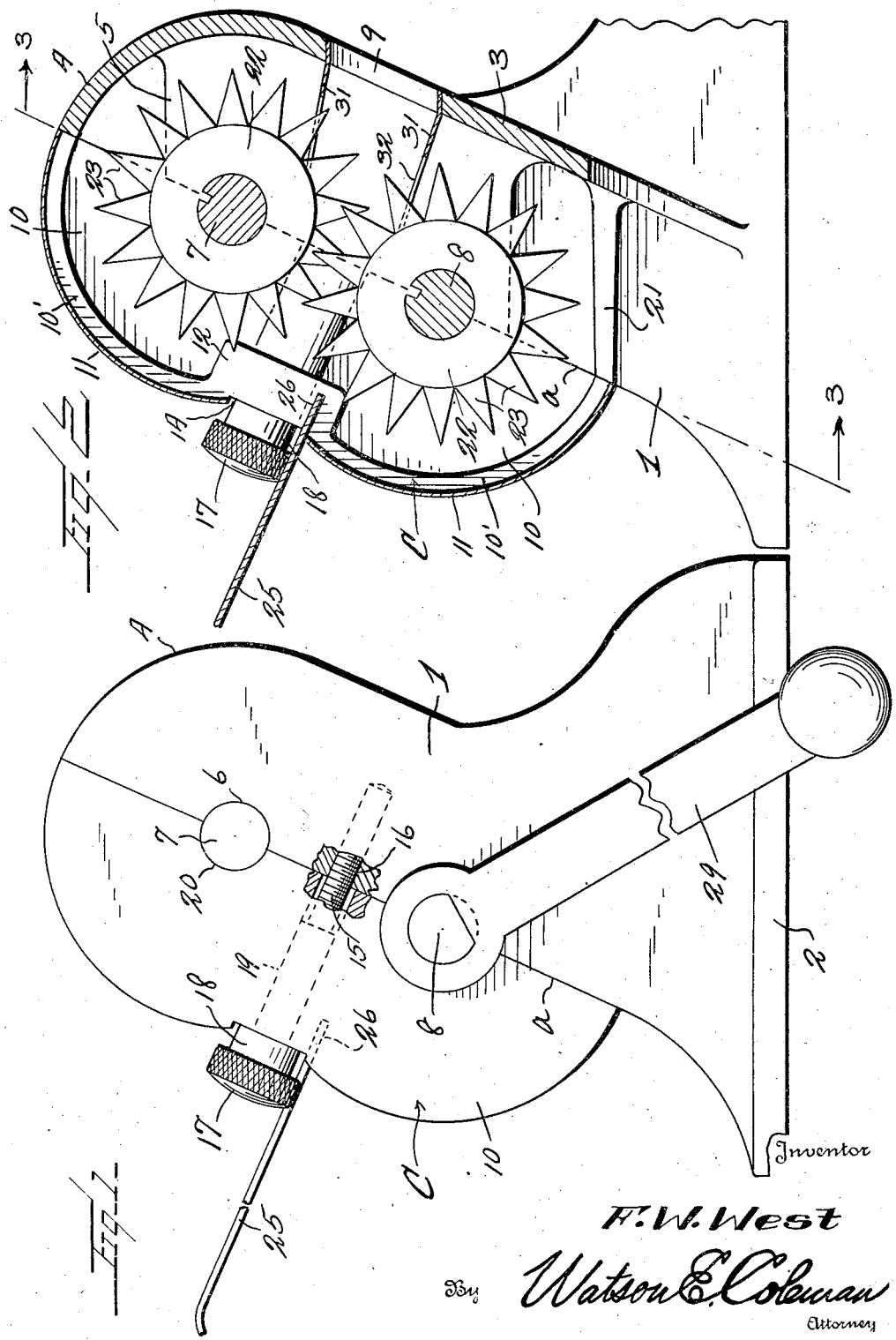

Patented May 14, 1935

2,001,641

UNITED STATES PATENT OFFICE 2,001,641

MEAT TENDERER

Frank W. West, Bellefonte, Pa.

Application June 21, 1934, Serial No. 731,775

4 Claims. (Cl. 17—26)

This invention relates to a meat tenderer, and it is an object of the invention to provide a device of this kind having a pair of processing rollers between which a slice of meat is adapted to be passed, the processing media carried by the rollers penetrating the meat as it passes between the rollers.

Another object of the invention is to provide a device of this kind comprising a pair of rollers between which a slice of meat is adapted to pass, the peripheries of the rollers carrying members to penetrate the meat, one of said rollers when the device is in operation having a peripheral speed faster than the peripheral speed of the second roller.

A still further object of the invention is to provide a device of this kind comprising a pair of penetrating rollers between which a slice of meat is adapted to pass together with means to facilitate the travel of the meat toward the rollers together with means to assure proper delivery of the meat as it passes from between the rollers.

The invention consists in the details of construction and in the combination and arrangement of the several parts of my improved meat tenderer whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in end elevation of a meat tenderer constructed in accordance with an embodiment of my invention with a portion broken away;

Figure 2 is a vertical sectional view taken through the device as herein disclosed at substantially midway its ends;

Figure 3 is a sectional view taken substantially on the line 3—3 of Figure 2 looking in the direction of the arrows, the intermediate portion of the device being broken away;

Figure 4 is a fragmentary view of an end portion of the cover as herein disclosed looking at the inside thereof.

Figure 5 is a fragmentary view partly in section and partly in plan of one of the releasing and cleaning members herein employed.

As disclosed in the accompanying drawings, my improved device comprises two side plates 1 provided along their lower marginal portions with the outwardly disposed and laterally directed flanges 2 to provide means whereby the device may be effectively secured or anchored in desired position. The side plates 1 are of a material height and the major portion of the forward edge of each of these plates 1 is straight and disposed on an inward and upward angle with respect to the vertical of approximately thirty degrees although I do not wish to be understood as limiting myself to any such particular degree of angle.

The upper portions of the plates 1 are connected by a back plate 3 spaced a desired distance from the straight edges a of said side plates and substantially parallel therewith except the upper portion of such back plate 3 which is disposed on an upward and forward curvature, as at 4, the upper edge of this curved portion 4 of the back plate being flush with the straight edges a. The major portions of the side plates 1 at their central parts are of increased thickness, as at 5, said enlarged portions being inwardly disposed and the straight flat edges of these portions 5 at desired points spaced therealong are provided thereacross with the substantially semi-circular bearing grooves 6 which receive the end portions of the parallel shafts 7 and 8, said shafts readily dropping within said bearing grooves 6 in the assembly of the machine. The back plate 3 is provided thereacross with a discharge or delivery opening 9 substantially bridging the space between the opposed enlarged portions 5 of the side plates or members 1. This opening is also of a material height and substantially bridging the space between the shafts 7 and 8. Fitting on the forward or front open face of the housing as afforded by the side plates 1 and the back plate 3 is a cap member C. This member C comprises end heads 10 of a disk-like form and the flanges 10' of these heads 10 have interposed therebetween and secured thereto the enclosing plates 11. These flanges 10' at their opposite extremities are arcuate in form and disposed on an outbow as illustrated in Figure 2 of the accompanying drawings with the inner ends of said arcuate portions being connected with an intermediate straight portion 12 of a thickness materially greater than the thickness of the flanges 10'.

The inner marginal portions of the plates 11 terminate closely adjacent to these intermediate portions 12 whereby there is provided between said plates 11 a receiving or feeding opening 14.

The heads 10 have straight edges continued on the flanges 10' and the outer edges of the plates 11 whereby the cap member C may be snugly and effectively placed upon the straight edge portions of the housing or body member hereinbefore referred to and each of the enlarged portions 12 of the heads 10 have disposed therethrough elongated holding shanks 15 threading within the socket or recess 16 suitably positioned within a straight edge a or more particularly an enlarged portion 5 thereof.

Each of the portions 12 of a head 10 has a shank 15 freely disposed therethrough and the outer extremity of this shank 15 is provided with the head 17 for butting the outer end of a boss 18 extending out from the portion 12 and defining the opening 19 in said portion 12 through which the shank 15 is directed. The straight edge of each of the heads 10 of the cap member is provided with the suitably spaced bearing recesses 20 which engage over the end portions of the shafts 7 and 8 and of course register with the bearing recesses 6 hereinbefore referred to.

When the cap member C is in applied position the shafts 7 and 8 are effectively maintained in place. The lower end portions of the side plates or members 1 have disposed transversely thereacross in advance of the back or rear plate 3 the inwardly directed flanges 21, the outer ends of which being flush with the straight edges a of the side plates or members 1. The lower straight edges of the flanges 10' contact with the outer ends of the flanges 21, whereby is further assured the desired effective mounting of the cap member C.

Each of the shafts 7 and 8 between the portions 5 of the side plates or members 1 have mounted thereon for rotation therewith a plurality of roll sections 22, each of which has projecting outwardly and radially therefrom a series of circumferentially spaced and penetrating members or teeth 23, each preferably substantially in the form of a pyramid. Each of the sections 22 has its members or teeth 23 positioned at one end portion thereof so that the opposite end portion constitutes what may be termed an extended hub 24, the periphery of which being cylindrical smooth and unobstructed.

The roll sections 22 are so mounted upon the shafts 7 and 8 to bring the members or teeth 23 of the sections of one shaft into alternate arrangement with the teeth 23 of the roll sections of the second shaft as particularly illustrated in Figure 3 of the drawings, and while the teeth or members 23 are in mesh, it is to be noted that the shafts 7 and 8 are spaced apart such a distance as to maintain these teeth or members 23 of the sections of one shaft entirely out of contact with the teeth of the sections of the second shaft with a material spacing therebetween.

By the use of the roll sections 22 I find that there is a great advantage over a solid roll because if a member or tooth 23 should break it is only necessary to replace a section whereas if a solid roll was used an entire new roll would have to be substituted.

The slice of meat to be operated upon is delivered between the shafts 7 and 8 through the receiving or feed opening 14 and to facilitate the delivery of the meat slice I provide a feed table 25, which when applied is disposed on a downward incline toward the opening 14. This table has an end portion inserted or extended a slight distance through the opening 14 and said inserted end portion of the table 25, or more particularly the side marginal portions thereof, is received within the grooves 26 suitably provided in the portions 12. This interfitting of the table 25 with the portions 12 assures the maintenance of the table 25 in desired effective working position, yet permits the same to be readily removed for cleansing, storing or packing.

As the meat slice passes between the shafts 7 and 8 toward the discharge opening 9 with the shafts 7 and 8 in rotation, the teeth or members 23 penetrate the slice from opposite sides bringing the juices and sweetness of the meat to the surface and breaking apart the sinews and thereby assuing the slice when delivered being tender and palatable. The penetration of the teeth or members 23 into the meat slice also results in the steak as delivered from the device being in the best possible condition for cooking.

Corresponding end portions of the shafts 7 and 8 extend beyond the adjacent side plate or member 1 and to said extended portions of the shafts 7 and 8 are affixed the meshing gears 27 and 28, the gear 28 on the shaft 7 being of a diameter greater than the diameter of the first gear 27 carried by the shaft 8 whereby the roll sections 22 on the shaft 7 are caused to rotate at a slower peripheral speed than the peripheral speed of the roll sections 22 on the shaft 8. Or, in other words, the peripheral speed of the sections 22 on the shaft 8 is greater than that of the sections 22 on the shaft 7. This is of advantage as it assures the most effective treatment of the meat slice or steak and as it passes through the device.

The gears 27 and 28 also assure the required relative rotation of the shafts 7 and 8 and the roll sections 22 thereon and, as herein disclosed, the shaft 8 has its second end portion extended beyond the adjacent end plate or member 1 to permit an operating crank 29 or other desired operating element to be engaged therewith. While the accompanying drawings show the shaft 8 being driven by a crank it is to be understood that any other means may be employed as desired to effect such rotation. It is highly important that means be provided to assure the complete release of the meat slice or steak after it passes between the shafts 7 and 8 and more particularly the roll sections 22 thereon. For this purpose I provide the comb plates 31 suitably secured to the upper and lower edge walls of the discharge opening 9 in the rear or back plate 3 and extending forwardly therefrom. These plates 31 are provided with the forwardly directed teeth 32 possessing a certain degree of inherent resiliency and which contact with the peripheries of the hub portions 24 at points slightly inwardly between the opposed hub portions. This placement of the plates 31 with the fingers 32 assures effective release of the meat slice or steak from the roll sections and also assures the proper discharge of the meat slice or steak out through the opening 9. Furthermore, the contact of the teeth 32 with the hub portions 24 assure such portions being maintained clean, as any meat particles having a tendency to adhere thereto will be readily scraped off by the extremities of the teeth 32 as the shafts 7 and 8 rotate.

From the foregoing description it is thought to be obvious that a meat tenderer constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising a member having side plates, an interposed back plate connecting said side plates and provided between the side plates with a discharge opening, the forward edges of the side plates having their upper portions straight and disposed on an inward and upward angle with respect to the vertical, said straight edges at points spaced therealong being provided with bearing recesses, shafts engaging within said recesses and bridging the space between the side plates, a cap member having head plates having straight edges butting the straight edges of the side plates, said head plates of the cap member also having bearing recesses in the straight edges to engage over the shafts within the recesses of the side plates, means coacting with the head plates of the cap member and the side plates for holding the cap member in place, penetrating members carried by the shafts between the side plates and connected for unitary rotation, and means for rotating the shafts, the cap member having a feed opening.

2. A device of the class described comprising a member having side plates, an interposed back plate connecting said side plates and provided between the side plates with a discharge opening, the forward edges of the side plates having their upper portions straight and disposed on an inward and upward angle with respect to the vertical, said straight edges at points spaced therealong being provided with bearing recesses, shafts engaging within said recesses and bridging the space between the side plates, a cap member having head plates having straight edges butting the straight edges of the side plates, said head plates of the cap member also having bearing recesses in the straight edges to engage over the shafts within the recesses of the side plates, means coacting with the head plates of the cap member and the side plates for holding the cap member in place, penetrating members carried by the shafts between the side plates and connected for unitary rotation, means for rotating the shafts, the cap member having a feed opening, and members bridging the spaces between the upper and lower edges of the discharge opening and the shafts to assure proper discharge through said opening.

3. A device of the class described comprising a member having side plates, an interposed back plate connecting said side plates and provided between the side plates with a discharge opening, the forward edges of the side plates having their upper portions straight and disposed on an inward and upward angle with respect to the vertical, said straight edges at points spaced therealong being provided with bearing recesses, shafts engaging within said recesses and bridging the space between the side plates, a cap member having head plates having straight edges butting the straight edges of the side plates, said head plates of the cap member also having bearing recesses in the straight edges to engage over the shafts within the recesses of the side plates, means coacting with the head plates of the cap member and the side plates for holding the cap member in place, penetrating members carried by the shafts between the side plates and connected for unitary rotation, means for rotating the shafts, the cap member having a feed opening, and a feed table carried by the cap member and extending within the feed opening of the cap member.

4. A device of the class described comprising side plates, an interposed back plate connecting said side plates and provided with a discharge opening, a pair of shafts rotatably engaged with the side plates, roll sections mounted on said shafts for rotation therewith, outstanding penetrating teeth carried by one end portion of each of the roll sections and spaced circumferentially therearound, the shafts being spaced apart a distance to permit the teeth of the roll sections on one shaft to alternately extend between the teeth of the roll sections on the second shaft but in materially spaced relation at all points, means for rotating the shafts, and members secured to the upper and lower edges of the discharge opening in the back plate and having fingers contacting with the end portions of the roll sections remote from the teeth to assure proper delivery to the discharge opening.

FRANK W. WEST.